US009058954B2

(12) United States Patent
Sanborn et al.

(10) Patent No.: US 9,058,954 B2
(45) Date of Patent: Jun. 16, 2015

(54) CARBON NANOTUBE FIELD EMISSION DEVICES AND METHODS OF MAKING SAME

(71) Applicant: Georgia Tech Research Corporation, Atlanta, GA (US)

(72) Inventors: Graham Sanborn, Atlanta, GA (US); William Judson Ready, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/771,845

(22) Filed: Feb. 20, 2013

(65) Prior Publication Data

US 2013/0214244 A1 Aug. 22, 2013

Related U.S. Application Data

(60) Provisional application No. 61/600,870, filed on Feb. 20, 2012.

(51) Int. Cl.
*H01L 29/06* (2006.01)
*H01J 1/304* (2006.01)
*H01J 9/02* (2006.01)
*H01J 3/02* (2006.01)
*B82Y 99/00* (2011.01)
*B82Y 10/00* (2011.01)

(52) U.S. Cl.
CPC .......... *H01J 1/3042* (2013.01); *H01J 9/025* (2013.01); *B82Y 99/00* (2013.01); *H01J 1/304* (2013.01); *H01J 3/021* (2013.01); *H01J 2201/30469* (2013.01); *B82Y 10/00* (2013.01)

(58) Field of Classification Search
USPC ............................................. 257/10; 438/20
See application file for complete search history.

(56) References Cited

U.S. PATENT DOCUMENTS

| 5,501,893 | A | | 3/1996 | Laermer et al. |
| 5,552,659 | A | * | 9/1996 | Macaulay et al. ............ 313/310 |
| 5,872,422 | A | | 2/1999 | Xu et al. |
| 5,947,421 | A | | 9/1999 | Beattie et al. |
| 6,339,281 | B2 | | 1/2002 | Lee et al. |
| 6,448,701 | B1 | * | 9/2002 | Hsu ............................... 313/309 |
| 6,469,425 | B1 | | 10/2002 | Sakai et al. |
| 6,522,061 | B1 | | 2/2003 | Lockwood |
| 6,648,712 | B2 | * | 11/2003 | Choi et al. ....................... 445/51 |

(Continued)

OTHER PUBLICATIONS

Ho, Justin et al., "Photolithographic Fabrication of Gated Self-Aligned Parallel Electron Beam Emitters with a Single-Stranded Carbon Nanotube", Nanotechnology, vol. 19, pp. 1-5, 2008.

(Continued)

*Primary Examiner* — Cheung Lee
*Assistant Examiner* — Stephen Bradley
(74) *Attorney, Agent, or Firm* — Troutman Sanders LLP; Ryan A. Schneider; Christopher W. Glass

(57) ABSTRACT

Devices and methods are described for a cathode having a plurality of apertures in an insulating layer, pits in a substrate layer, and emitters in the pit. The device can also have gate layer on top of the insulating layer which has an opening that is substantially aligned with the pit and the aperture. The emitter can be an array of substantially aligned carbon nanotubes. The device and method produces cathodes that are designed to avoid shorting of the cathode due to emitter-gate contact and other fabrication challenges.

20 Claims, 10 Drawing Sheets

(56) References Cited

U.S. PATENT DOCUMENTS

| | | |
|---|---|---|
| 6,732,978 B2 | 5/2004 | Ockels et al. |
| 6,777,862 B2 | 8/2004 | Fisch et al. |
| 6,858,455 B2 | 2/2005 | Guillom et al. |
| 6,969,536 B1 | 11/2005 | Tuck et al. |
| 6,979,947 B2 * | 12/2005 | Yaniv et al. .................. 313/495 |
| 6,987,027 B2 | 1/2006 | Jin |
| 7,012,266 B2 | 3/2006 | Jin |
| 7,085,351 B2 | 8/2006 | Lu et al. |
| 7,173,366 B2 | 2/2007 | Choi et al. |
| 7,220,971 B1 | 5/2007 | Chang et al. |
| 7,239,076 B2 | 7/2007 | Lee et al. |
| 7,294,248 B2 | 11/2007 | Gao |
| 7,332,736 B2 | 2/2008 | Jin |
| 7,411,341 B2 | 8/2008 | Hudspeth et al. |
| 7,465,210 B2 | 12/2008 | Kim et al. |
| 7,507,987 B2 * | 3/2009 | Kim et al. ...................... 257/10 |
| 7,785,907 B2 | 8/2010 | Zheng et al. |
| 7,816,851 B2 | 10/2010 | Yoo et al. |
| 7,868,850 B2 | 1/2011 | Jin et al. |
| 7,887,689 B2 | 2/2011 | Zhou et al. |
| 2003/0030356 A1 | 2/2003 | Fran et al. |
| 2004/0069994 A1 | 4/2004 | Guillorn et al. |
| 2004/0080260 A1 * | 4/2004 | Park et al. ...................... 313/495 |
| 2005/0067936 A1 | 3/2005 | Lee et al. |
| 2005/0139817 A1 * | 6/2005 | Choi et al. ...................... 257/10 |
| 2005/0225228 A1 | 10/2005 | Burden et al. |
| 2006/0066217 A1 | 3/2006 | Son |
| 2006/0214560 A1 | 9/2006 | Noguchi et al. |
| 2006/0290252 A1 | 12/2006 | Lo et al. |
| 2007/0247048 A1 | 10/2007 | Zhang et al. |
| 2009/0316860 A1 | 12/2009 | Okunuki et al. |
| 2010/0019653 A1 | 1/2010 | Jung |
| 2011/0005191 A1 * | 1/2011 | Ready et al. ...................... 60/202 |

OTHER PUBLICATIONS

International Search Report and Written Opinion dated Sep. 21, 2009 for PCT Patent Application No. PCT/US2009/036204.

* cited by examiner

CARBON NANOTUBE FIELD EMISSION DEVICES AND METHODS OF MAKING SAME

RELATED APPLICATIONS

This application claims, under 35 U.S.C. §119(e), the benefit of U.S. Provisional Patent Application Ser. No. 61/600,870, filed 20 Feb. 2012, the entire contents and substance of which are hereby incorporated by reference as if fully set forth below.

FEDERALLY SPONSORED RESEARCH STATEMENT

This invention was made with United States Government support under agreement number HR0011-09-C-0142 awarded by the United States Department of Defense Advanced Research Projects Agency. The United States Government has certain rights in this invention.

TECHNICAL FIELD

The various embodiments of the present disclosure relate generally to field effect devices and field emission devices, and more particularly to carbon nanotube containing electrodes and cathodes, devices using same, and method of making same.

BACKGROUND OF THE INVENTION

The current technological age is embodied by a constant push for increased performance and efficiency of devices. This push is particularly observable for technologies that involve electron sources, such as spacecraft propulsion, electronic displays, and X-ray sources. Efficiency of these systems can be increased by reducing weight and power consumption, but is often limited by a bulky and energy-hungry electron source.

Most electron sources utilize thermionic emission, which involves heating a metal filament to several thousand degrees Celsius in order to produce electrons. Thermionic emission sources possess inherent inefficiencies because they are relatively bulky and must be heated to very high temperatures, thus consuming more energy. One alternative to thermionic emission is field electron emission (FE), which involves the application of electric fields at room temperature to induce electron emission via tunneling. Normally, large electric fields (hundreds of V $\mu m^{-1}$) are needed for FE, but this field is highly dependent on the electron source geometry, where sharp tips can reduce the macroscopic electric field needed. Since no heating is necessary, these sources can be much more efficient and reliable if emission can be achieved at a sufficiently low potential, providing marked improvement over current technologies.

One category of materials utilize devices based on a Spindt cathode designs, where an emitter in a triode device produce electrons in response to a conductive base substrate and a counterelectrode, or gate electrode. Use of sharp tipped nanomaterials such as carbon nanotubes have been utilized in the field emission performance. Initial work by this group has focused on building emitters for use in, for example, cold cathodes.

SUMMARY

The various embodiments herein provide a cathode or an electrode having a substrate layer, an insulating layer disposed on the substrate layer, a plurality of apertures in the insulating layer, and a plurality of pits in the substrate layer substantially aligned with the plurality of apertures. Each aperture can have a larger diameter in the distal side from the substrate and a smaller diameter in side proximate to the substrate. Each pit can also contain an emitter.

In some embodiments, the emitter can be an array of carbon nanotubes in the pit. The pit can also include a catalyst layer on which the carbon nanotubes are grown. The catalyst layer can be iron, nickel, cobalt or an alloy or mixture thereof.

In some embodiments, the pit in the substrate layer can have a diameter and a depth. The diameter can be at least 100 nm, at least 250 nm, at least 500 nm, or at least 1 µm. The diameter can be between about 1 and about 5 µm, or between about 1 and about 3 µm. The depth can be about 1 to about 100 µm, or about 5 to about 50 µm. The pit can have an aspect ratio of depth to diameter of about 1:1, about 2:1 or about 5:1.

In some embodiments, the difference in size of larger diameter and smaller diameter of the aperture can be at least about 100 nm, at least about 200 nm or at least about 500 nm. In some embodiments, the smaller diameter of the aperture is about equal to the diameter of the pit. In some embodiments, the smaller diameter of the aperture is larger than the diameter of the pit. The aperture can have a thickness of between about 0.5 µm to about 5 µm, about 0.5 to about 4 µm, about 1 to about 5 µm, about 1 to about 4 µm, or about 2 to about 4 µm.

In some embodiments, the device can also include a gate layer on top of the insulating layer. The gate layer can have a gate layer opening above the vertical space of the emitter. The gate layer does not extend into the space above the emitter. The distance between the edge of the gate layer and the vertical space above the emitter can be described as a horizontal buffer zone or distance. In an embodiment, the horizontal buffer distance is at least about 100 nm, at least about 200 nm, or at least about 500 nm. In an embodiment, the gate layer does not extend to the overlap the smaller diameter of the aperture, or extends into the space between the larger diameter and the smaller diameter of the aperture. In an embodiment, the gate layer does not extend into the larger diameter of the gate layer. In an embodiment, the gate layer can have a thickness of about 100 to about 600 nm, or about 200 to about 500 nm. The gate layer can be composed of polycrystalline silicon, chromium, molybdenum, titanium or tungsten, or mixtures or alloys thereof. The gate layer can also be composed of polycrystalline silicon.

In an embodiment, a device can include the cathode, the gate layer and also a conducting anode. The device can be a triode device, or a triode-based field emission device. The device can include the cathode, a gate layer, and a conductive anode. The triode device can include an ion thruster, such as a Hall effect thruster, and electrostatic ion thruster, a colloid thruster, or a field emission electric propulsion thruster. The anode of the triode device can be anodes that provide work, light, energy, heat, electron cascades or other types of events when contacted by an electron.

In an embodiment, a method of manufacturing a carbon nanotube field emission devices can include providing a substrate, a conducting layer, an insulating layer positioned substantially between the substrate and the conducting layer, and a photoresist mask having gaps therein on top of the conducting layer, etching the conducting layer with a first anisotropic etching process, isotropically etching the insulating layer using a wet/acid etch, etching the substrate with a second anisotropic etch to create a pit in the substrate layer, and synthesizing carbon nanotubes in the pit via a thermal chemical vapor deposition.

In an embodiment, the insulating layer can be etched for a time sufficient to expose the substrate at a diameter greater than the photoresist gaps. The diameter of the pit can be approximately the same or larger than as the photoresist gap.

In an embodiment, the first anisotropic etching, the second anisotropic etch, or both the first and second anisotropic etches can include a Bosch etch. The method can also include removing any conductive layer that was undercut by etching the insulating layer. The undercut conductive layer can be removed with a plasma etch, reactive gas etch, or wet/acid etch.

In an embodiment of the method, the carbon nanotubes can be synthesize by depositing a catalyst on the bottom of the pit and growing carbon nanotubes on the catalyst using chemical vapor deposition. In an embodiment, the chemical vapor deposition can be a low pressure chemical vapor deposition.

DETAILED DESCRIPTION

Figure 1:
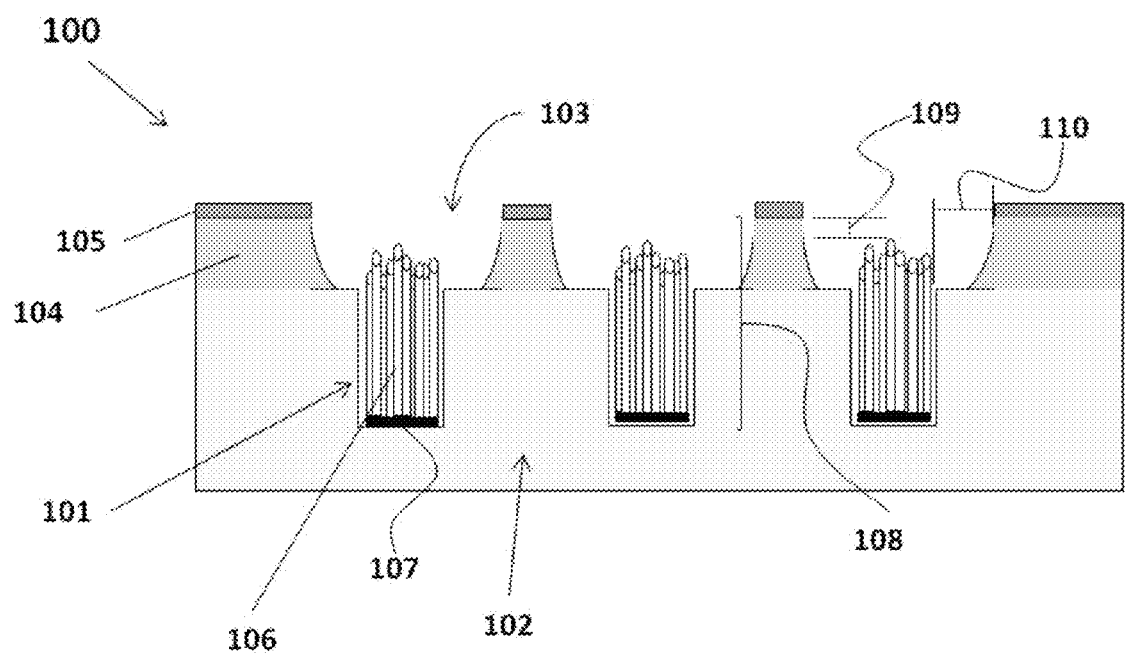
FIG. 1 is a schematic illustration of a carbon nanotube containing cathode in accordance with exemplary embodiments of the disclosure.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. Various components may be identified having specific values or parameters, however, these items are provided as exemplary embodiments. Indeed, the exemplary embodiments do not limit the various aspects and concepts of the disclosure as many comparable parameters, sizes, ranges, and/or values may be implemented. The terms "first," "second," "primary," "secondary," "top," "bottom," "distal," "proximal," and the like, do not denote any order, quantity, or importance, but rather are used to distinguish one element from another.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The various embodiments of this disclosure relates to field emission or field effect devices, and more specifically to carbon nanotube field emitters, and to the devices using the same. In one embodiment, the disclosure can include an internally gated carbon nanotube field emitter using a Spindt cathode-based design specifically constructed to prevent shorting of the gate. The disclosure can include pits that extend into the Si substrate, which can allow for fabrication of a larger carbon nanotube-to-gate separation. This can prevent shorting while still allowing growth of longer carbon nanotubes, which can be more uniform and reproducible than short (<1 μm) carbon nanotubes. In addition, isotropic etching can be used to create a horizontal buffer zone between the gate and the carbon nanotubes. The carbon nanotubes are self-aligned to and within 10 microns from the gate, creating large electric fields at the carbon nanotube tips at relatively low potentials (~100 V). This field emitter design can have a very low operating voltage in a compact package that enables portable electron source devices.

In an embodiment, the emitter or device can contain a cathode that can include a substrate layer and a insulating layer, and optionally include a gate layer.

Figure 2A:
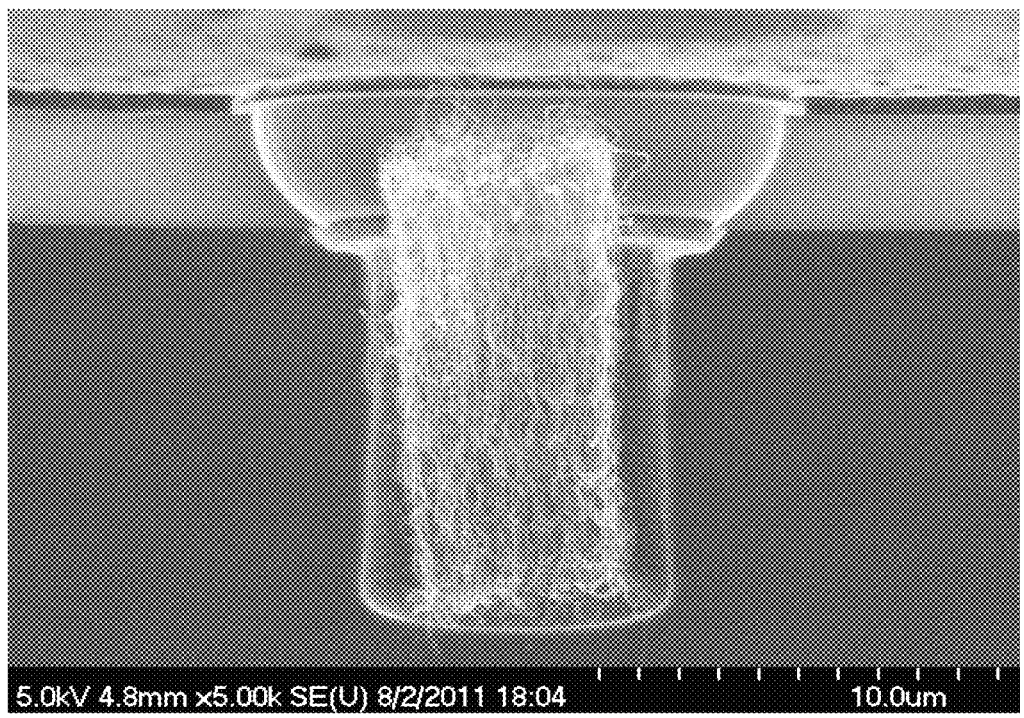
FIG. 2A is a SEM image of an aperture and pit containing a carbon nanotube emitter in a cathode in accordance with exemplary embodiments of the disclosure.
Figure 2B:
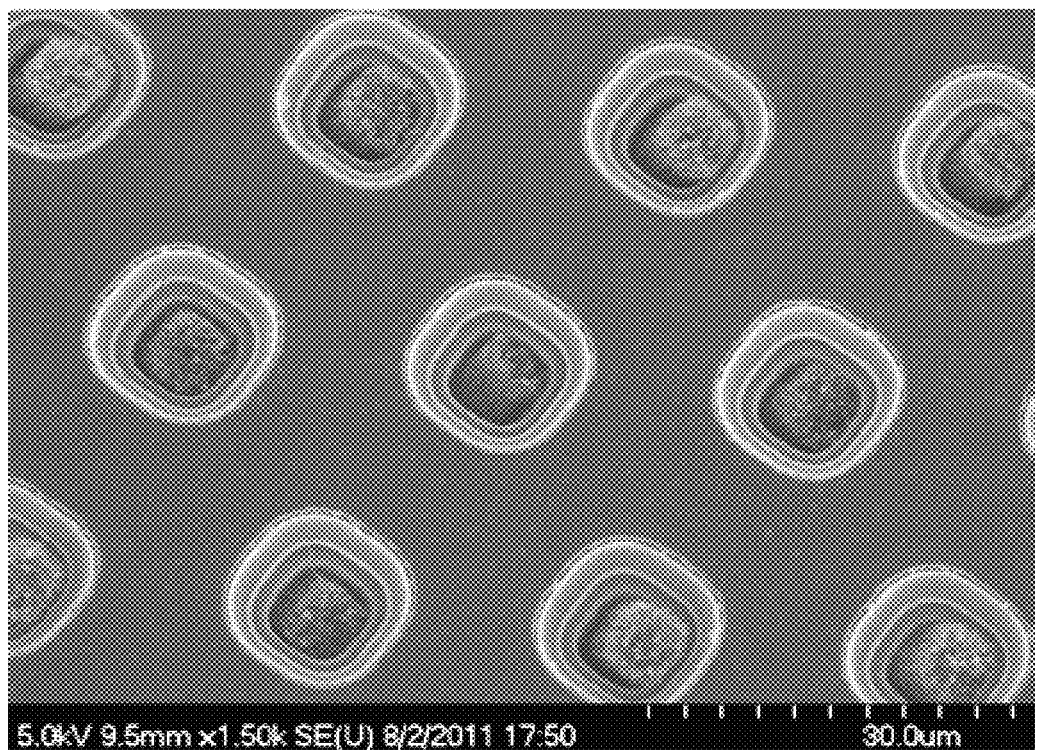
FIG. 2B is an SEM image of an array of emitters as shown in FIG. 2A in a cathode in accordance with exemplary embodiments of the disclosure.

An exemplary cathode 100 is shown in FIG. 1. The cathode can include a pit 101 that extends into the substrate 102, an aperture 103 in insulator 104, and a gate layer 105. The pit 101 can contain an array of vertically aligned carbon nanotubes 106 on catalyst 107 which can extend into the aperture 103. The aperture 103 and pit 101 can also be described together as well 108. As discussed below, the cathode can also include a horizontal buffer distance 110 between the edge of the gate layer and the edge of the carbon nanotube, and a vertical buffer distance 109 between the top of the carbon nanotubes and bottom of the gate layer. An SEM of a single pit and aperture. i.e. a well, is shown in FIG. 2A and a cathode having a plurality of pits and apertures with carbon nanotubes therein is shown in FIG. 2B.

Figure 3:
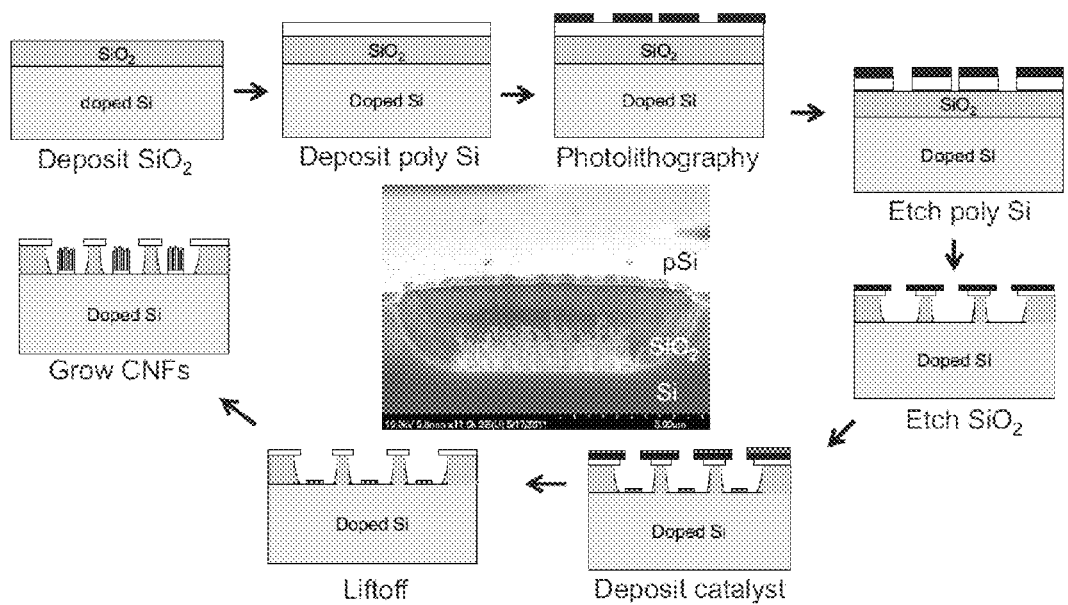
FIG. 3 is a schematic process flow chart and an SEM image in accordance with exemplary embodiments of the disclosure.

In order to prepare the cathode described herein, initial efforts focused on several standard lithographic techniques to build a cathode via a top-down strategy, followed by creating the carbon nanotubes in a bottom up construction. In a typical top down method, as exemplified in FIG. 3, a substrate having an insulating layer above it and a gate layer above the insulating layer would be patterned with a mask, and the gate layer and insulating layer lithographically etched to expose the conductive substrate. A catalyst would then typically be added to the conductive substrate, and carbon nanotubes grown on the catalyst. An SEM of the product is shown in the inset of FIG. 3.

However, efforts to build consistent stable emitters using this strategy were problematic. At least in part, the problem with stable emitters related to the highly sensitive nature of these cathodes to maintain consistent uniform design, with limited fabrication defects and emitter uniformity. A defect in a well across millions of wells, due either to construction or to emitter growth, can short out an entire device. The errors in the standard process were traced down to primarily three fabrication problems: plasma processing in etching the insulator atop the substrate; catalyst deposition; and emitter formation, particularly for carbon nanotube emitters.

Efforts to plasma etch the insulator layer, generally $SiO_2$, led to arcing and shorting on the cathodes and thus a wet etch process was selected in place of the plasma etch to isotropically etch the $SiO_2$. This step can be important because it can avoid the harsh plasma oxide etch that could be damaging the oxide. It also can avoid plasma oxide etching on the backside of the wafer since the backside will be etched at the same time as the front. In addition, the wet etch does not consume any photoresist, which enables a large reduction in the thickness of photoresist needed. By way of example, a buffered oxide etch (BOE) solution can be used to etch the oxide. This etch provides a very consistent and even etch rate as long as good wetting and uniform mixing of the solution is achieved. Wafers can be mounted in a plastic sample holder and submerged in the solution of BOE with a magnetic stir bar. The stir bar provides greatly improved uniformity and etch rate over manual agitation. With this technique, the etch rate can be typically 100 nm/min and several extra minutes can be given to ensure the Si substrate is exposed in all features. These new etch techniques for the gate and oxide allow the Si substrate to be exposed in each pit with minimal plasma exposure.

A complication can arise from the oxide wet etch due to its isotropic nature. Since the oxide is so thick, as the acid etches down, it also etches outward which undercuts the gate layer, in some cases by several microns. This undercut can be very fragile and can easily fracture from handling, which can cause electrical shorts by contacting the Si in a etch pit, and will cause an inconsistent spacing from the gate to the carbon nanotubes. To remove this undercut, an isotropic p-Si etch using an $SF_6$ plasma can be typically completed at the end of the oxide etch.

Figures 4A, 4B:
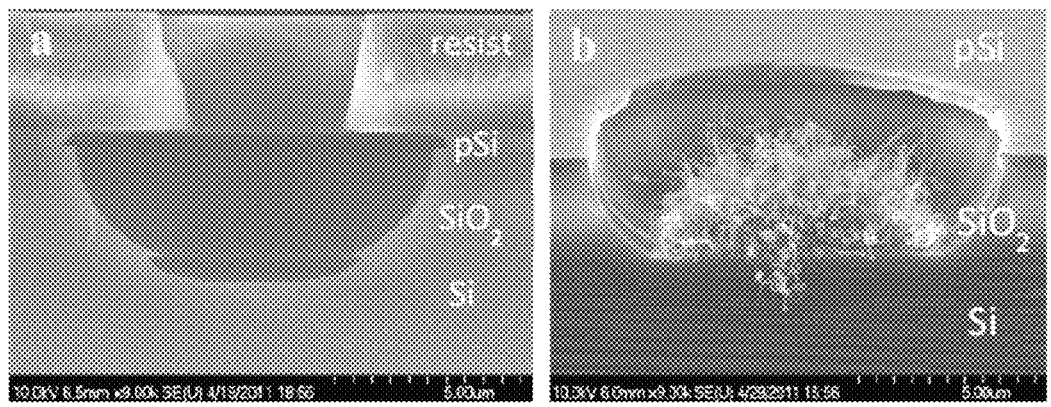
FIGS. 4A and 4B are SEM images of the surface of a cathode and emitter in accordance with exemplary embodiments of the disclosure.

However, this etch step, with the undercut shown in FIG. 4A, has several benefits. Etching back the p-Si undercuts the photoresist and can ensure that catalyst deposition does not occur on the gate, thus preventing possibly carbon nanotube growth on the gate. In addition, this etch can increase the diameter of the etch pit without increasing the catalyst spot size, which is determined by the unaffected photoresist hole diameter. This increase in the size can essentially give a horizontal buffer distance (or zone), discussed further below, between the carbon nanotube growth and the gate sidewall, thus preventing a contact between a carbon nanotube and the gate in the event that carbon nanotube growth is too long (FIG. 4B). This buffer zone can be highly beneficial because the many thousands of features per sample increase the chances of having an abnormally long carbon nanotube that can short the entire sample.

By way of example for this isotropic etch of the gate layer, the isotropic p-Si etch can be conducted simply on a Advanced Vacuum (Lomma, Sweden) Vision 320 RIE tool. The process uses a plasma power of 70 W with $SF_6$ at 25 sccm and $O_2$ at 5 sccm at 100 mTorr for 2-4 minutes to etch all of the undercut p-Si. This is a low power chemical etch, meaning that there is minimal damage to the oxide and a high selectivity between photoresist and $SiO_2$. Typically this method can etch the p-Si to about 100-200 nm past the p-Si/$SiO_2$ interface, where the close proximity of the layers hinders diffusion of reactive species and prevents etching. This etch can act as stop mechanism that can minimize any jagged etch profile, as long as the etch is long enough to remove all undercut material. In other words, the jagged profile can still occur, but it is mostly removed as the etch continues to the p-Si/$SiO_2$ interface. Tuning when the p-Si etch is completed in relation to the oxide etch can determine the amount of increase in the gate hole diameter and the relation of the gate sidewall to the oxide sidewall. For example, normally the isotropic p-Si etch is completed when the oxide wet etch is mostly complete, leaving about 100-200 nm $SiO_2$ in the pit. This remaining oxide can prevent etching of the Si substrate. At this point, there is enough removable undercut p-Si to create a ~3 μm buffer zone around the carbon nanotube growth. After the $SF_6$ etch, the amount of BOE wet etch will determine the relation of the $SiO_2$ sidewall to the p-Si. Normally enough oxide etching is completed so that the sidewalls are roughly parallel. A sample with thermal oxide, p-Si gate, and the etching mentioned in this section is shown in FIG. 4A where the undercut photoresist is visible.

Moreover, this isotropic etch can be tailored to remove the gate layer for only a portion of the gate beyond the $SiO_2$ interface. Thus, in an embodiment, the gate can extend beyond its contact point with the insulating layer, and yet not reach as far as the space vertically above the emitter.

Figure 5A:
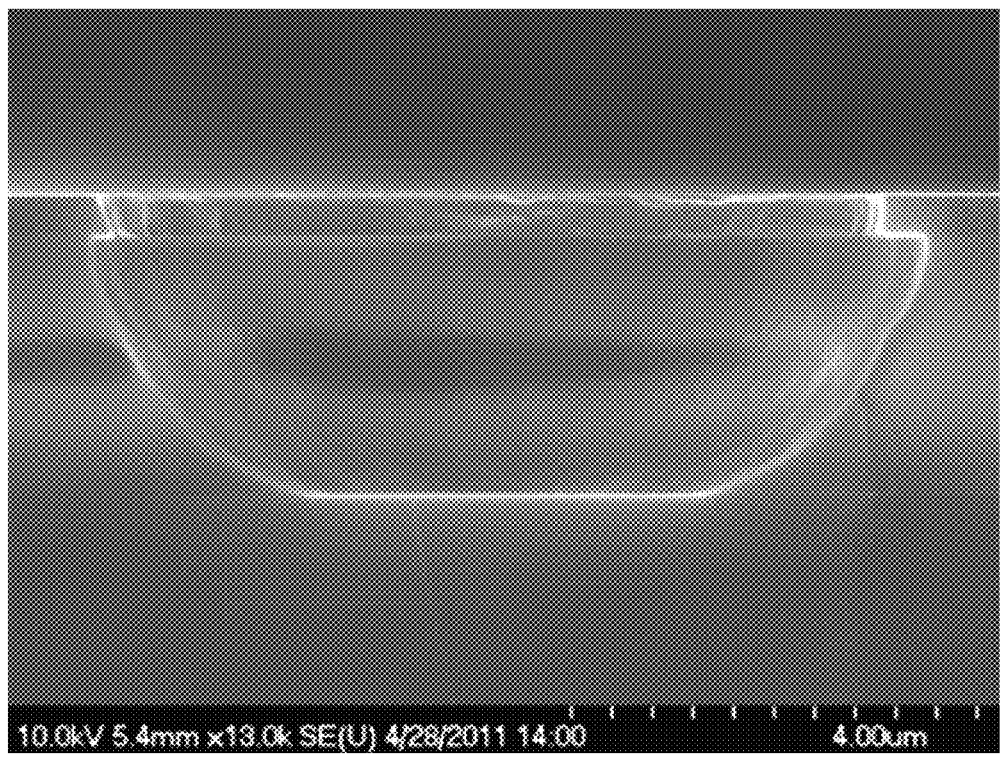
FIGS. 5A and 5B are SEM images of an aperture and emitter in the cathode in accordance with exemplary embodiments of the disclosure.
Figure 5B:
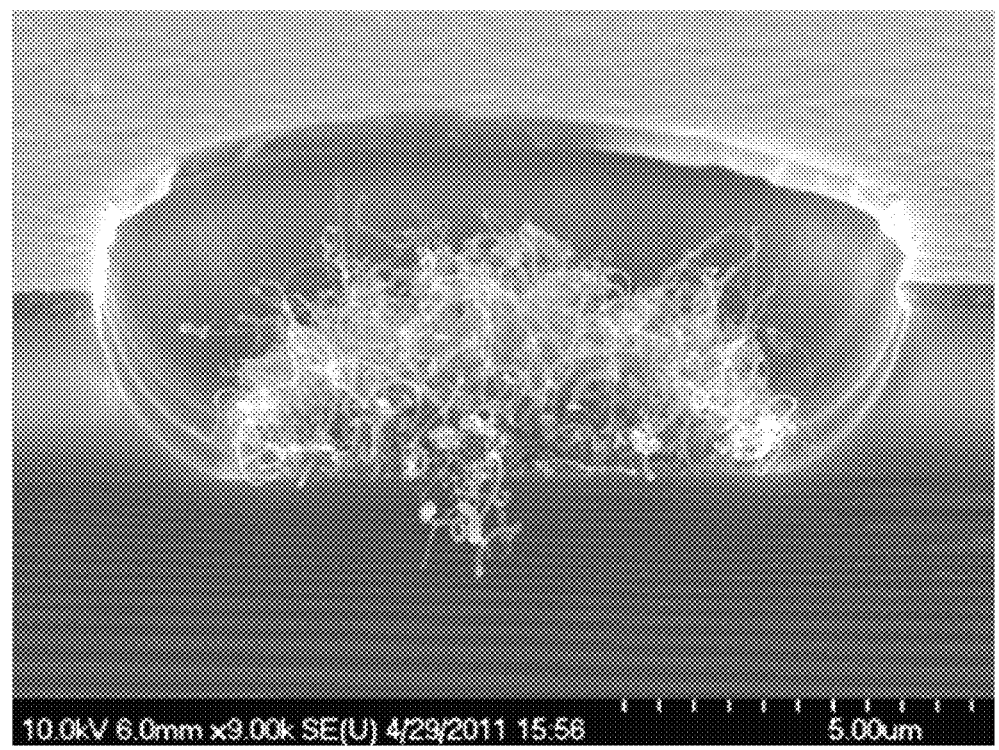

Thus, as shown in FIG. 3, an aspect of the disclosure can include a process composed of at least some of the steps of depositing an insulator such as $SiO_2$ on a substrate such as a doped silicon, depositing a conducting layer or gate layer, such as poly silicon, preparing a photomask, etching the gate layer, then wet etching the insulating layer. A catalyst can be added to the substrate and an emitter such as carbon nanotubes can be grown on the catalyst. A SEM of a well prepared according to this method is shown in FIG. 5A, and an additional well before and after carbon nanotube formation is shown in FIG. 5B.

After the above changes to the fabrication process for the isotropic etching techniques, wafers that were fabricated up to catalyst deposition had a majority of samples still at an open circuit. Normally greater than 90% of samples would be open, and the electrically shorted samples can be accounted for by isolated fabrication and handling defects. This improvement in the yield is attributed to minimizing plasma exposure. However, whenever the carbon nanotube catalyst was deposited using electron beam evaporation, a majority of samples would be electrically shorted. At times catalyst deposition on the pit sidewalls was noticed in the SEM, however other times it was not. This variance could be explained by the often hundreds of thousands of pits in a sample, where individually viewing them would be overly laborious. Catalyst deposition on the sidewall causing a short could occur due to a lithography defect in a single pit, which would be very hard to find. Deposition was especially evident when a short BOE etch was used to try to reverse a short circuit. Thus, catalyst deposition and the position of the emitter, particularly carbon nanotubes, can be related in conjunction with improvements that are encompassed by this disclosure.

Initially, plasma enhanced CVD (PEVCD) was used to prepare emitters, particularly carbon nanotube based emitters, because it can achieve precise height control. This control is achieved by the driving force for carbon nanotube growth, a plasma, which can be instantly terminated by removing the electric field. However, PECVD can cause arcing and shorting of the gate during the growth process due to the high potential (up to 700 V) of the plasma. Since the gate is electrically isolated from the substrate, it floats at the plasma potential, which causes arcing and damage across the sample electrode spacing. Shorting was not due to carbon nanotube growth since it occurred even if no carbon source was used.

Low pressure CVD (LPCVD) synthesis for carbon nanotube growth was explored as a possible alternative to PECVD growth. Results from past gate isolation tests suggest that open circuit triodes with carbon nanotubes could theoretically be made if no plasma was used for carbon nanotube growth. It is much harder to synthesize very short carbon nanotubes with thermal CVD because the growth rate is generally faster and there is no immediate removal of growth species like there is in PECVD.

Also, the carbon nanotubes can be denser when aligned, which can increase screening effects. The low pressure method can allow for better height control and uniformity for high surface area samples than atmospheric methods. Initial growth tests showed that it was not possible to uniformly synthesize carbon nanotubes less than 4 µm so that they would remain below the gate. Therefore, a second Bosch etch process was developed to deepen the etch pits by etching into the Si substrate. This etch c chosen because it could easily increase the pit depth by 10 µm or more without significant consumption of photoresist, and thus the lithography process would not need to be modified. In addition, the Si walls in the pit could enhance vertical alignment of the carbon nanotube growth due to steric hindrance.

Figures 6A, 6B:
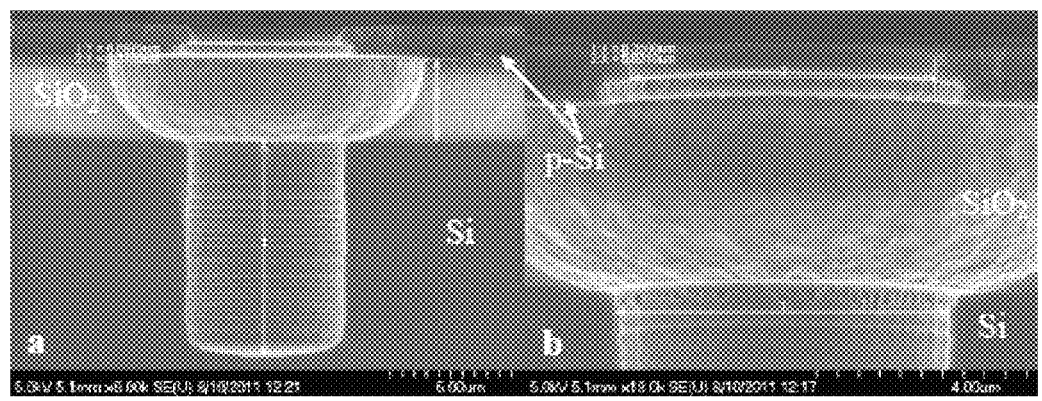
FIGS. 6A and 6B are SEM images of a portion of the cathode in accordance with exemplary embodiments of the disclosure.

The substrate Bosch etch can be completed using the same SPTS ICP tool after the oxide wet etch and without the isotropic p-Si etch. The etch process can be very similar to the p-Si Bosch process except the etch and passivation times are different. A longer passivation step was used to prevent excess etching of the undercut p-Si (FIG. 6B). This change can be important because it can be easy for the p-Si to be severely etched past the oxide in the high density plasma. By way of example, a process was optimized to have vertical or slightly widening sidewalls with a 7 second etch step and an 11 second passivation step. The etch depth can generally depend on the diameter of the holes where 30 cycles achieves a ~10 µm Si etch for a 6 µm diameter (FIG. 6A). The Si pit diameter can be determined by the diameter of the photoresist hole and the amount of Si that is exposed by the oxide wet etch, since $SiO_2$ works as a mask for this etch. It can be important to have a very uniform oxide wet etch in order to have a uniform Si etch.

Figures 7A, 7B:
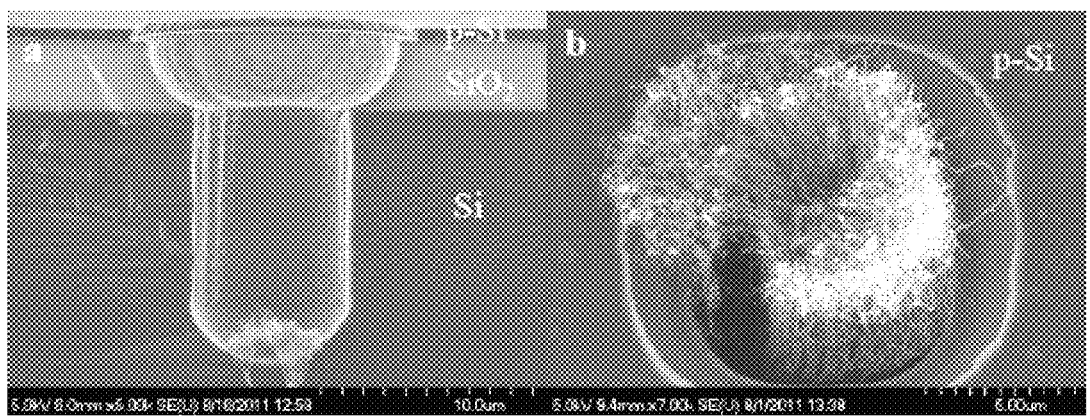
FIG. 7A is an SEM image of a portion of the cathode in accordance with exemplary embodiments of the disclosure.
FIG. 7B is an SEM image of a portion of the cathode having carbon nanotube growth to the sidewall in accordance with exemplary embodiments of the disclosure.

The isotropic p-Si etch can be completed after the Si Bosch etch because the Si pit can be widened as well in order to prevent catalyst deposition on the sidewalls. By way of example, the same Advanced Vacuum Vision 320 RIE etch process for the p-Si isotropic etch can be used. This etch can both remove the undercut gate and widen the Si pit at the same time. The etch can take about 4 min to completely etch back the p-Si to the oxide and sufficiently widen the Si pit. This etch also can increase the depth of the Si pit by ~3 µm, which is shown by the curved base of the pit in FIG. 7A, causing an increase in the total pit depth to 15-20 µm. After the $SF_6$ etch, a ~2 min BOE oxide etch can remove any undercut oxide at the Si surface. This oxide often is not shadowed by the photoresist and can have carbon nanotube growth that can short the gate, as shown in FIG. 7B. If a total pit depth of 20 µm is assumed, then a photoresist overhang of ~870 nm is needed to prevent sidewall deposition at a 2.5° angle. The photoresist overhang in FIG. 6A shows this shadowing is accomplished after the $SF_6$ etch.

Figures 8A, 8B:
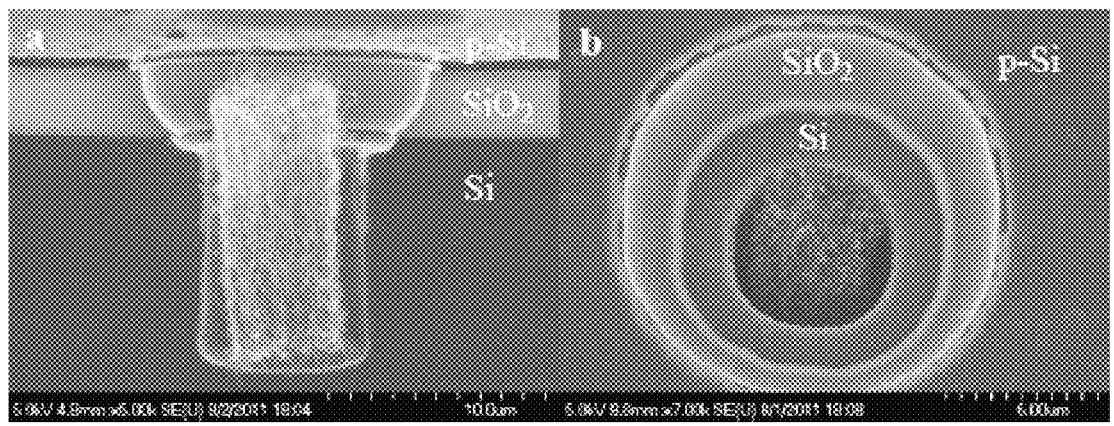
FIGS. 8A and 8B are SEM images of a portion of the cathode including a carbon nanotube emitter in accordance with exemplary embodiments of the disclosure.

While LPCVD synthesis processes disclosed herein uses Fe catalyst (because it is a common LPCVD catalyst and has a standardized synthesis process,) other catalysts can also be applied to this system. By way of example, a 3 nm Fe layer can be deposited by electron beam evaporation in the Angstrom Engineering EvoVac tool at a pressure less than $1 \times 10^{-6}$ torr. The optimized LPCVD process with the same Aixtron Black Magic CVD can accomplish highly uniform growth. Uniformity can be especially important for LPCVD because the carbon nanotube growth rate is much faster. The recipe uses $N_2$ for purging and cooling, $C_2H_2$ as the carbon source, and $H_2$ as the reducing gas. The chamber can be first heated to 650° C. on the IR sensor at a rate of 150° C./min with a $H_2$ flow rate of 700 sccm at 10 mbar. The samples can then be annealed at 650° C. for 15 minutes to ensure catalyst particle formation is uniform across the sample. Then the top heater can be turned on at 30% power (~650° C. during growth) and the substrate temperature can be ramped to 700° C. at a rate of 150° C./min Once 700° C. is reached, a 90 second stabilization step can be used to ensure uniform temperature throughout the sample. Next is the growth step with 120 sccm of $C_2H_2$ for 30-90 sec, depending on the pit depth. After growth, all inputs are terminated, the chamber is pumped down to 0.2 mbar, and then cooled under $N_2$ to less than 400° C. Typical carbon nanotube growth with carbon nanotube tips close to the gate is shown in FIGS. 8A and 8B. Vertical alignment is achieved with very consistent growth across an entire sample. In addition, the carbon nanotubes stay aligned past the Si pit so that the buffer layer around the gate remains free of carbon nanotubes.

This optimized LPCVD growth can be very favorable for the triode FE design. The carbon nanotubes can be synthesized very close to the gate and they remain aligned.

Thus, the catalyst can be deposited such that the catalyst or subsequent carbon nanotube growth would not electrically short the gate. The catalyst can be deposited by electron beam evaporation, which is a line-of-sight deposition process. The pit geometry can be carefully tuned such that the photoresist aperture is smaller than the gate, oxide, and Si pit apertures (See FIGS. 6A and 6B.) This resulting overhang ensures that the small angle of deposition is shadowed so that deposition only occurs in the bottom of the pit. For example, in the extreme case that a pit is 20 μm deep with a deposition angle of 1.9°, a 0.7 μm photoresist overhang is required to completely shadow the catalyst to the bottom of the pit.

Finally, the pit geometry can prevent a short between the carbon nanotube and the gate. The pits can extend into the Si substrate, thus creating a larger electrode separation than would be possible by just using an oxide layer. This deeper pit can allow for fabrication of a larger carbon nanotube-to-gate separation to prevent shorting while still allowing growth of longer, more reproducible, carbon nanotubes. The lateral p-Si etch can increase the diameter of the gate aperture without increasing the catalyst spot size. This etch essentially can create a buffer zone between the carbon nanotube growth and the gate side wall, thus preventing a short between a carbon nanotube and the gate. This etch geometry can be highly beneficial because having the many thousands of features per sample can increase the chances of having an abnormally long carbon nanotube that can short the entire sample by contacting the gate.

Thus, in view of the developments described above, several embodiments of this disclosure can be described. In an embodiment, a device can contain a cathode, and anode and a gate. The device can be a triode based field emission device. The device can also be a traditional anode-cathode construction.

The cathode can have a substrate layer and an insulating layer disposed on the substrate layer. The substrate can be any substance known to one of ordinary skill in the art, and can include silicon, preferably a doped silicon. The insulating layer can similarly be any substance known to one of skill in the art and can include for example silicon dioxide, silicon nitride, or alumina. In one preferred combination the substrate and insulating layer is $Si/SiO_2$.

The substrate layer thickness can be any thickness that one of ordinary skill in the art would use for these materials, with the caveat that the thickness of the substrate layer must be thicker than the pit etched into the substrate. In an embodiment, the substrate can be at least 300 μm.

When a gate layer is present, the gate layer can be disposed on the insulating layer. The gate layer can be any conducting material known to one of ordinary skill that would work in the present system. In an embodiment the gate layer can be polycrystalline silicon, chromium, molybdenum, titanium, or tungsten, or alloys thereof of mixtures thereof. In one embodiment, the gate layer can be polycrystalline silicon. The gate layer can have a thickness of about 100 nm to about 600 nm, or a thickness of about 200 nm to about 500 nm.

The cathode can have an array of wells across its surface, each of which can include an aperture and a pit, as noted above, and an emitter. The cathode can include a plurality of apertures in the insulating layer and a plurality of pits in the substrate layer. The apertures and substrate pits are preferably substantially aligned.

The aperture in the insulating layer of the cathode can have a larger diameter and a smaller diameter. The larger diameter is measured at the end of the aperture that is distal from the substrate layer (and would be proximal to the gate layer in configurations that contain the gate layer.) Conversely, the smaller diameter is measured at the end of the aperture that is proximal to the substrate (and would be distal from the gate layer in configurations that contain the gate layer.) As noted by the terms, a diameter that is labeled a larger diameter can have a diameter that is wider than the smaller diameter. Alternatively, the diameters can be referred to as an upper diameter (distal to the substrate) and the lower diameter (proximal to the substrate.) Again, generally, the upper diameter can be larger than the lower diameter.

In an embodiment, a difference in diameters for the upper (larger) and lower (smaller) can be at least 0.1 μm (i.e. 100 nm). In some embodiments, the difference in diameters can be at least 0.2 μm, at least about 0.3 μm, or at last about 0.5 μm. The difference can also be at least about 1 μm, or at least about 1.5 μm.

The aperture can have a sidewall, which defines the space that the aperture resides within the insulating layer. As the sidewall of the aperture is followed from the upper diameter to the lower diameter, the sidewall can have a linear shape between the two diameters. Preferably, the sidewall can have a tapered shape between the diameters. Alternatively, other shapes can be present, such as for example a stair step or a combination of shapes, i.e. for two or more tapered portions of the sidewall.

The aperture can be about the same thickness as the insulating layer atop the substrate layer. Thus, the aperture can have a thickness, or depth, of about 0.5 μm to about 5 μm, about 0.5 to about 4 μm, about 1 μm to about 4 μm, or about 2 μm to about 4 μm.

The pit in the substrate layer, i.e. the substrate pit, can be described as having a width or diameter, i.e. the dimension across the pit, parallel to the plane of the substrate, and a height or depth, i.e. the dimension through the pit that is perpendicular to plane of the substrate. In an embodiment, a pit can have a diameter of at least about 50 nm, at least about 100 nm or at least about 250 nm. The pit can have a diameter of at least about 500 nm, at least about 750 nm, or at least about 1 μm. In an embodiment the diameter can be between about 250 nm to about 5 μm, about 500 nm to about 5 μm, or about 1 μm to about 5 μm. The diameter can also be about 1 μm to about 3 μm. In an embodiment, a pit can have a depth of at least about 1 μm, or at least about 5 μm. The pit can have a depth of about 1 μm to about 100 μm, or a depth of about 5 μm to about 50 μm.

The dimensions of the pit can also be characterized by an aspect ratio (AR) that represents the ratio of the depth to the diameter. In an embodiment, the aspect ratio can be at least 1:1, preferably greater than 1:1. In an embodiment, the aspect ratio can be at least about 2:1, at least about 3:1, or at least about 5:1.

Thus, in an embodiment, the pit can have a diameter of at least about 500 nm, a depth about 1 μm to 5 μm, and an aspect ratio of between about 1:1 to about 10:1. The pit can have a diameter of at least about 1 μm and a depth of between 5 μm to about 50 μm. The pit can have a diameter of about 1 μm to about 3 μm, and a depth about between about 5 μm and about 50 μm.

In an embodiment, the pit can have a diameter about equal to the smaller diameter of the aperture. In another embodiment, the pit can have a diameter that is less than the smaller diameter of the aperture.

As noted above, the pit of each well can contain an emitter. The emitter can be any material known to one of skill in the art. In one embodiment the emitter can be an array of vertically aligned carbon nanotubes. As used herein, the term "aligned" encompasses items having at least a portion of a dimension (e.g., length, width, height, or the like) being either parallel to each other or within about 15 degrees of being parallel to one another if projected infinitely into space. Thus, two CNTs that do not directly contact each other, but would contact each other if the CNTs were infinitely long, and the angle formed between them is less than or equal to about 15 degrees, are considered aligned for the purposes of this disclosure. When a number of items are described herein as being aligned, then at least 70 percent of the items are aligned with one another.

The carbon nanotubes in the pit can be grown on a catalyst. In an embodiment, the pit can contain a catalyst layer disposed on the bottom of the pit. The catalyst layer can be any material known to one of ordinary skill for carbon nanotube growth. The catalyst layer can be iron, nickel, cobalt, or alloys thereof, and mixtures thereof. The catalyst layer can be iron or an alloy thereof.

Figure 10:
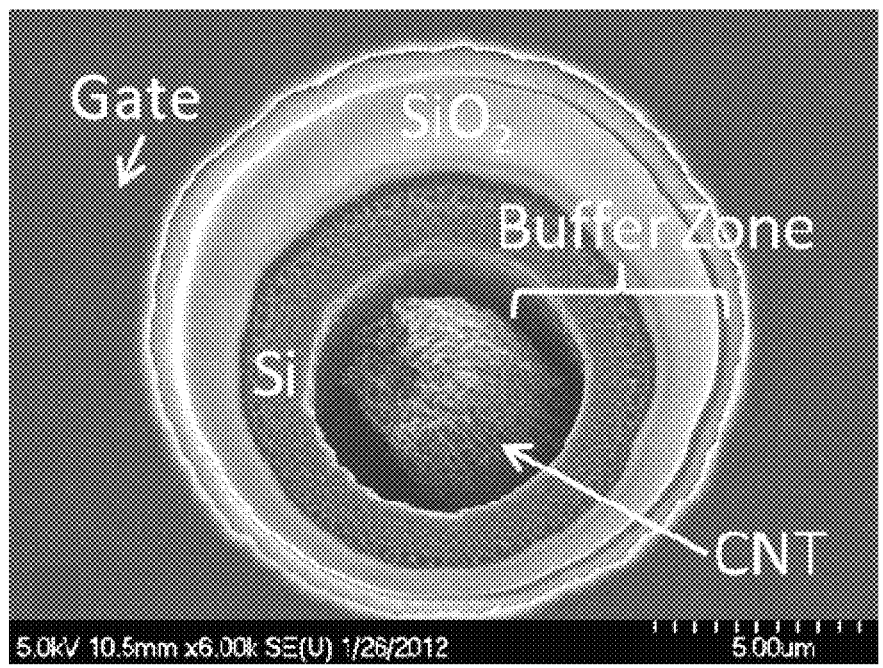
FIG. 10 is an SEM image of the surface of a cathode showing a single well with a carbon nanotube emitter in accordance with exemplary embodiments of the disclosure
Figure 11:
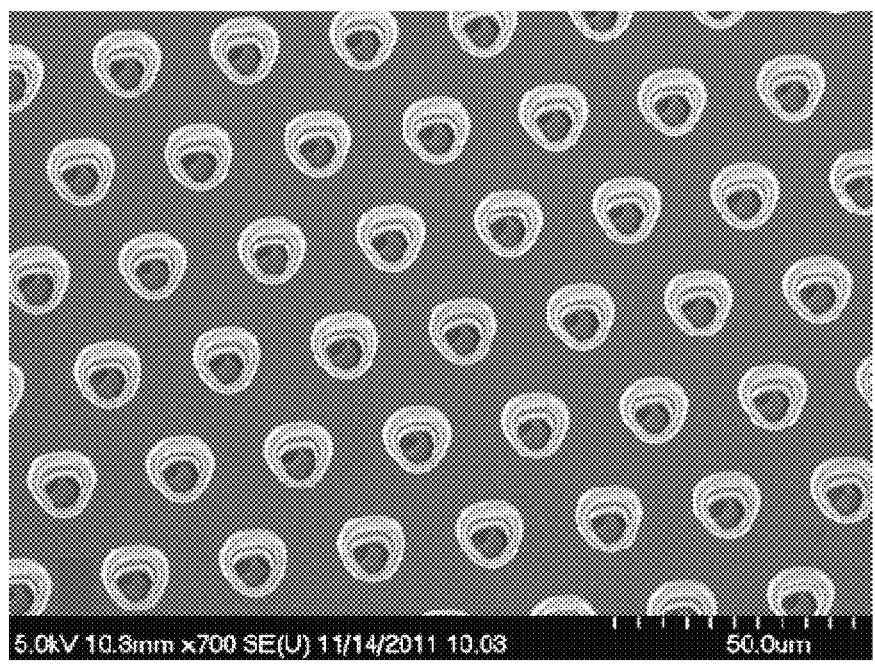
FIG. 11 is an SEM image of the surface of a cathode showing an array of the wells shown in FIG. 10 in accordance with exemplary embodiments of the disclosure

As noted above, the cathode of the disclosure have several elements that can allow for effective production of large scale field emitters and electrodes. The array of emitters have to be constructed with a very low level of errors in order for the cathode to not short. Thus, several elements combine to make the devices. In particular, the pit in the substrate layer, the widening aperture, and the controlled positioning of the gate layer produces a buffer zone between the growing emitters and the gate layer. Controlling the positioning of the gate layer produces a space above the pit and aperture that is referred to herein as a gate layer opening. The contact of the gate layer and emitter has been a significant problem in building these emitters, as shown in FIG. 7B, but the buffer zone can cut down or eliminate these defects. The buffer zone can actually be described in terms of two dimensions. First, the vertical buffer distance is the distance measured perpendicular to the substrate plane, from the top of the emitter to a plane that includes the bottom of the gate layer. Second, the horizontal buffer distance is measured parallel to the substrate plane from the edge of the emitter to the edge of the gate layer (i.e. the gate layer opening). An exemplary buffer zone, in this instance a horizontal buffer distance, is shown in FIG. 10, where the gate layer has been etched back to beyond the upper edge of the tapered aperture. Thus, in an embodiment, the gate layer can be separated from the outer edge of the emitter by a buffer distance, wherein the buffer distance includes a horizontal buffer distance and a vertical buffer distance.

Several factors go into the amount of buffer zone in a cathode. For example, the depth and width (both upper and lower diameters) of an aperture can control the amount of distance that the gate layer can have from the emitters, in both the horizontal and vertical dimensions. Similarly, the gate layer can be etched back in the process to give a gate layer opening that can be equal to the larger diameter of the aperture, that can be larger than the larger diameter of the aperture (as in FIG. 10) or that can be narrower than the larger diameter and therefore overhangs the aperture.

The position of the gate layer opening can be described relative to several parts of the cathode. In an embodiment, the gate layer can not extend to the vertical space above the emitter, thereby defining the minimum horizontal buffer distance, i.e. horizontal buffer distance 110 in FIG. 1. In an embodiment, the horizontal buffer distance is at least 100 nm, at least 200 nm, at least 500 nm, or at least 750 µm.

In an embodiment, the gate layer cannot extend beyond the smaller diameter of the aperture. In an embodiment, the gate layer can extend to a distance between the edge of the larger diameter to the edge of the smaller diameter. Alternatively, the gate layer cannot extend beyond the larger diameter of the aperture.

Figure 9:
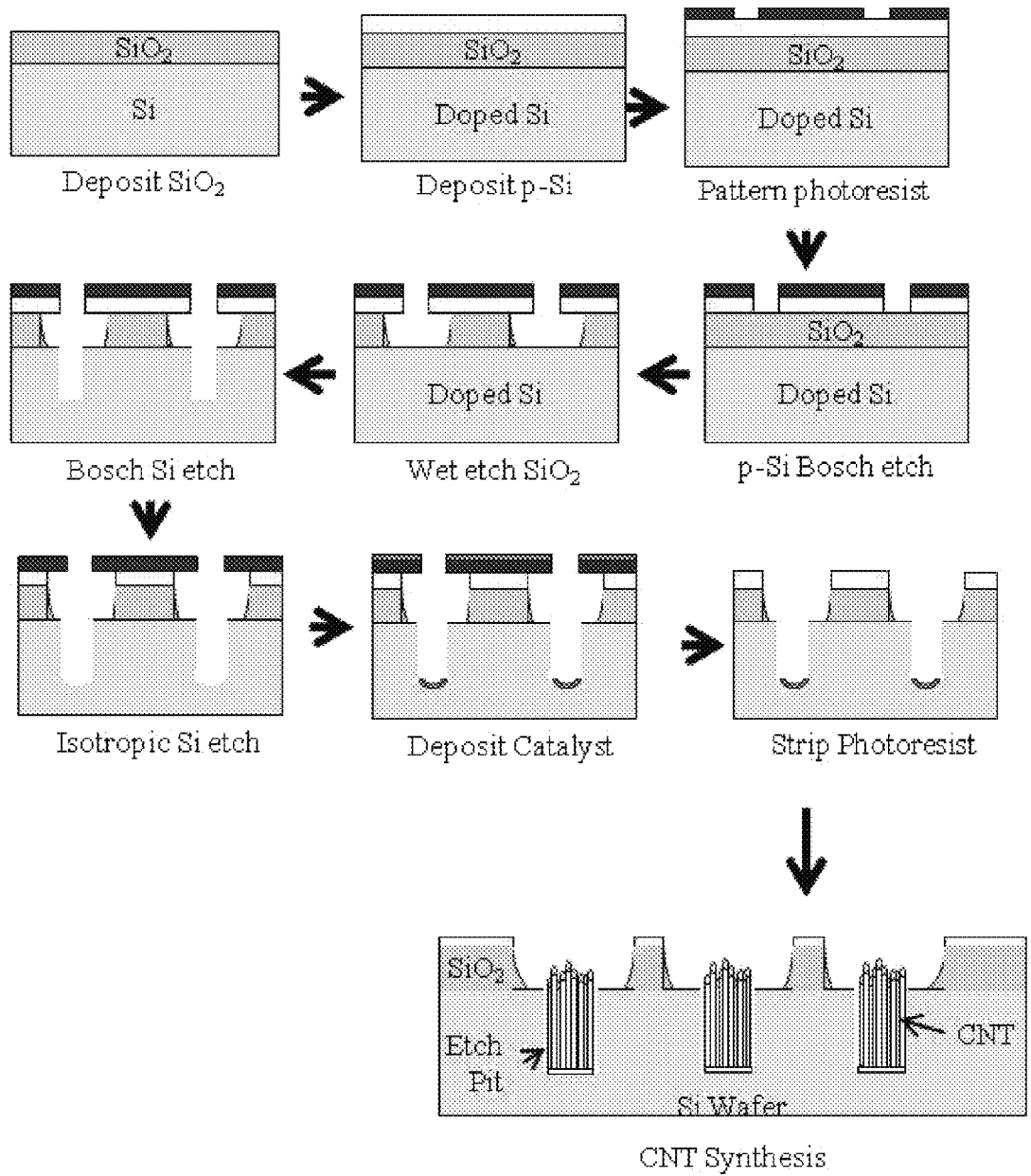
FIG. 9 is a schematic flow chart of a process for preparing a cathode in accordance with exemplary embodiments of the disclosure.

The position of the gate layer can also be described with respect to the vertical buffer distance 109 in FIG. 9. The vertical buffer distance can be effectively zero, when the emitters extend to a space parallel to the gate layer opening. In an embodiment, at least a majority of the emitters are at least 0.1 µm below the gate layer opening, or at least 0.5 µm below the gate layer opening. In an embodiment, at least a majority of emitters extend to between about 0.5 µm to about 5 µm from the gate layer opening.

Similarly distances can be discussed in terms of the gate layer opening, which is the opening created in the gate layer above the pit. In an embodiment, the gate layer opening can have a diameter of at least 200 nm larger than the pit diameter, or at 500 nm larger than the pit diameter.

In the course of constructing the devices herein, and in view of the buffer zone, an alternate embodiment of the disclosure includes a cathode having the insulating layer and aperture and the substrate layer and pit, where the aperture has an upper and lower diameter that are nearly equal, but that are both larger than the pit diameter by at least 250 nm. The gate layer opening in this embodiment can also be larger than the pit diameter.

The cathode and gate layer can also be referred to generically as an electrode.

The surface of the cathode can have several millions of wells therein, and the amount of wells per area can be adjusted to a level that one of ordinary skill in the art would use for a certain application. In one embodiment, the pitch can be at least 5 µm, at least 10 µm, or at least 25 µm.

The cathode disclosed herein, and optionally the gate layer, can be combined with a conducting anode (or simply an anode.) Several devices known in the art contain anodes that provide work, light, energy, heat, electron cascades, or other types of events when contacted by the incoming electron that has been emitted by the cathode and optional gate layer. In an embodiment, the anode can include an electron collector, an x-ray source, a satellite thruster, a surface Plasmon resonance generator, a traveling wave tube, radar source, or light source. In one embodiment, the anode generates an ion stream in response to the electrons from the cathode, and the device can be described as an ion thruster. The ion thruster can be a Hall effect thruster, and the electrode/cathode would be a Hall effect thruster or a reaction mass neutralizer. The ion thruster can be an electrostatic ion thruster and the electrode/cathode could be a reaction mass neutralizer of an electrostatic ion thruster. The ion thruster could also be a colloid thruster, or a field emission electric propulsion thruster.

The anode can be set off from the outer surface of the cathode by a distance that one of ordinary skill in the art would utilize for the particular application. In an embodiment, the anode can be at least 10 µm from the surface of the cathode.

Each of these aspects can then be combined into several embodiments of this disclosure. In an embodiment, a cathode can contain a substrate layer, an insulating layer disposed on the substrate layer, a plurality of apertures in the insulating layer, and a plurality of pits in the substrate layer substantially aligned with the plurality of apertures. Each aperture can have a larger diameter in the distal side from the substrate and a smaller diameter in the proximal side to the substrate, and each pit can contain an emitter. The cathode can further include a gate layer disposed on the insulating layer.

In an embodiment, a device can contain cathode can contain the substrate layer, the insulating layer disposed on the substrate layer, the plurality of apertures in the insulating layer and the plurality of pits in the substrate layer substantially aligned with the plurality of apertures. Each aperture can have a larger diameter in the distal side from the substrate and a smaller diameter in proximal side to the substrate, and each pit can contain an emitter. The emitter can further include a gate layer disposed on the insulating layer, and can further include an anode disposed at a distance away from the top of the gate layer. In an embodiment, a triode device can comprise a cathode, an anode, and a gate layer, where the cathode and gate layer includes the elements discussed above.

As noted above, the method of manufacturing these emitters includes several steps that have not been typically applied in device construction, either alone or together, to develop the devices embodied here. Thus, an embodiment includes a method of manufacturing a carbon nanotube field emission device. The method includes providing a substrate, a conducting layer (referred to above as a gate layer), an insulating layer positioned substantially between the substrate and the conducting layer, and a photoresist mask having gaps therein on top of the conducting layer. The conducting layer is etched with a first anisotropic etching process, then the insulating layer is etched isotropically using a wet/acid etch, preferably a buffered oxide etch. The substrate is then etched with a second anisotropic etch to create a pit in the substrate layer and carbon nanotubes are synthesized in the pit via a thermal chemical vapor deposition. The insulating layer can be etched for a time sufficient to expose the substrate at a diameter greater than the photoresist gaps, or for a time sufficient to expose the substrate at a diameter approximately equal to the photoresist gaps.

In an aspect of the method, the pit in the substrate is etched at a diameter that is the same as the photoresist gap, preferably slightly larger than the photoresist gap. In an embodiment of the method, the first anisotropic etch or the second anisotropic etch, or both, can be a Bosch etch.

In an embodiment, the method can further include removing any conductive layer that was undercut by etching the insulating layer, after the second anisotropic etch, or removing a portion of the conductive layer (i.e. gate layer) opening to create the opening that is at least larger than the pit diameter, up to a size slightly larger than the larger diameter of the aperture.

In an embodiment, the carbon nanotubes synthesis can be accomplished by depositing a catalyst on the bottom of the pit, removing the photoresist, and growing carbon nanotubes on the catalyst using chemical vapor deposition, optionally low pressure CVD.

The surface of the cathode can have several millions of wells therein, and the amount of wells per area can be adjusted to a level that one of ordinary skill in the art would use for a certain application. In one embodiment, the pitch can be at least 5 μm, or at least 10 μm.

Reference will now be made in detail to specific aspects of the disclosed materials, compounds, compositions, articles, and methods, examples of which are illustrated in the accompanying Examples and Figures.

EXAMPLES

Arsenic-doped silicon wafers with a resistivity of 0.001-0.005 Ωcm serve as the substrate and cathode contact.

Thermally grown $SiO_2$ synthesized at 1100° C. for ~24 h is used as the insulator and doped polycrystalline silicon (p-Si) is used as the gate. The 500 nm p-Si is deposited by low pressure chemical vapour deposition (LPCVD) at 588° C. and 250 mTorr with a silane flow of 100 sccm for 90 min. The p-Si is doped with Techneglas (Perrysburg, Ohio) PhosPlus TP-470 solid source dopant by heating to 1050° C. for 1 h followed by a drive-in anneal at 1100° C. for 30 min. These particular materials are chosen to maximize film quality while maintaining ease of fabrication. Thermal oxide deposits the best quality $SiO_2$ in terms of density, uniformity, purity, and dielectric breakdown. It has a theoretical dielectric breakdown of about 1000 V $\mu m^{-1}$, which can be 10 times higher than CVD $SiO_2$. High dielectric breakdown prevents degradation of the device during operation. The p-Si is used for its robustness and high-temperature stability with $SiO_2$, preventing degradation during high-temperature fabrication and operation.

A schematic of the fabrication process is shown in FIG. 9. The back side p-Si is removed after deposition by a short $SF_6$ plasma etch and the back side oxide is removed during wet etching of the front oxide. Standard ultraviolet lithography is used to pattern the substrate instead of higher resolution methods, such as electron beam lithography, in order to maintain scalable fabrication methods. AZ Electronic Materials (Stockley Park, UK) 3312 photoresist is spin coated at 3000 RPM and baked at 95° C. for 10 min Photoresist exposure is at 365 nm and is developed in 300 MIF developer solution followed by a hard bake at 110° C. for 10-20 min Arrays of 4 μm diameter features across a 6×6 $mm^2$ square are patterned on each die with a pitch ranging from 25 to 400 μm in a hexagonal pattern. Depending on pitch, a die will have 217-56000 features.

A Bosch etch process in an SPTS (Newport, UK) deep reactive ion etch (RIE) tool anisotropically etches the p-Si gate. The etch step is 5 s with $SF_6$ at 130 sccm and $O_2$ at 13 sccm, a pressure of 10 mTorr, and a coil power of 600 W with a platen power of 30 W. The passivation step is 4 s with $C_4F_8$ at 50 sccm. Approximately eight cycles are needed. Standard isotropic plasma etching of p-Si does not achieve uniform etching due to the disparate etch rates of the crystal grains, which results in jagged side walls and loss of feature definition. The Bosch process is mainly used for its side wall passivation, which results in smoother etch side walls. The etch has short cycle times to minimize side wall roughness and achieve an anisotropic etch.

The $SiO_2$ is isotropically etched for 35 min in a buffered oxide etch (BOE) solution (6:1) using a magnetic stir bar. The $SiO_2$ is intentionally over-etched so that the exposed Si substrate in each pit is larger than the photoresist aperture. A second Bosch etch is used to deepen the etch pits by etching into the Si substrate using a 7 s etch and a 11 s passivation step for 30 cycles. This step is ideal as it increases the pit depth by 10 μm or more without significant removal of photoresist or increasing the insulation layer thickness. In addition, the Si walls in the pit enhance vertical alignment of the carbon nanotubes due to steric hindrance. Interestingly, the Si pit diameter is determined by the size of the photoresist aperture and not by the amount of Si surface exposed, as shown by the unetched Si surface in FIGS. 6A and 6B.

The isotropic oxide etch causes an undercut of the gate layer by several microns. An RIE process is used to simultaneously remove this undercut p-Si and increase the diameter of the Si pit. An Advanced Vacuum (Lomma, Sweden) Vision RIE is used at 70 W and 100 mTorr with 25 sccm of $SF_6$ and 5 sccm of $O_2$ for ~4 min Etching the p-Si ensures that catalyst cannot deposit on the gate and results in a ~3 μm lateral buffer zone between the carbon nanotube growth and the gate side wall, thus preventing an electrical short between the two. The Si pit is widened to prevent any catalyst deposition on the Si side walls and is consequently deepened to achieve a total pit depth of 15-20 μm. Typically, the p-Si is etched about 100-200 nm past the p-Si/$SiO_2$ interface, where the close proximity of the layers hinders diffusion of reactive species and prevents further etching. It is this etch stop mechanism that minimizes the jagged etch profile that can occur from etching the p-Si. The final etch geometry is shown in FIG. 7A.

The fabrication process allows a line-of-sight path for deposition of the 3 nm Fe catalyst layer directly on the base of the pit. Electron beam evaporation with an Angstrom Engineering (Kitchener, Canada) EvoVac system deposits catalyst at <1×10⁻⁶ torr. The photoresist is removed by a Baker (Phillipsburg, N.J.) PRS 2000 photoresist stripper, leaving catalyst only in the Si pits.

An Aixtron (Herzogenrath, Germany) Black Magic plasma enhanced CVD (PECVD) tool is used for all CNT synthesis.

An LPCVD system with precisely controlled process parameters and recipe steps is used to produce uniform and consistent carbon nanotube growth. The LPCVD synthesis uses $C_2H_2$ and $NH_3$ or $H_2$ at 700° C. and 10 mbar for 0.5-5 min Annealing at 650° C. for 15 min in $NH_3$ or $H_2$ ensures that catalyst particle formation is uniform across the sample. A change in growth of as little as 15 s can create a large change in carbon nanotube length, showing that precision is required. FIGS. 2A, 2B, 10 and 11 show that the carbon nanotube growth can be precisely controlled, remains aligned past the Si pit, and is uniform across many pits.

FE testing is conducted in a vacuum chamber at <1×10⁻⁶ torr in a triode design with the gate grounded, a negative bias on the cathode, and a +30 V bias on an anode 1.4 cm from the gate. Gate, cathode, and anode currents are independently measured.

Figure 12:
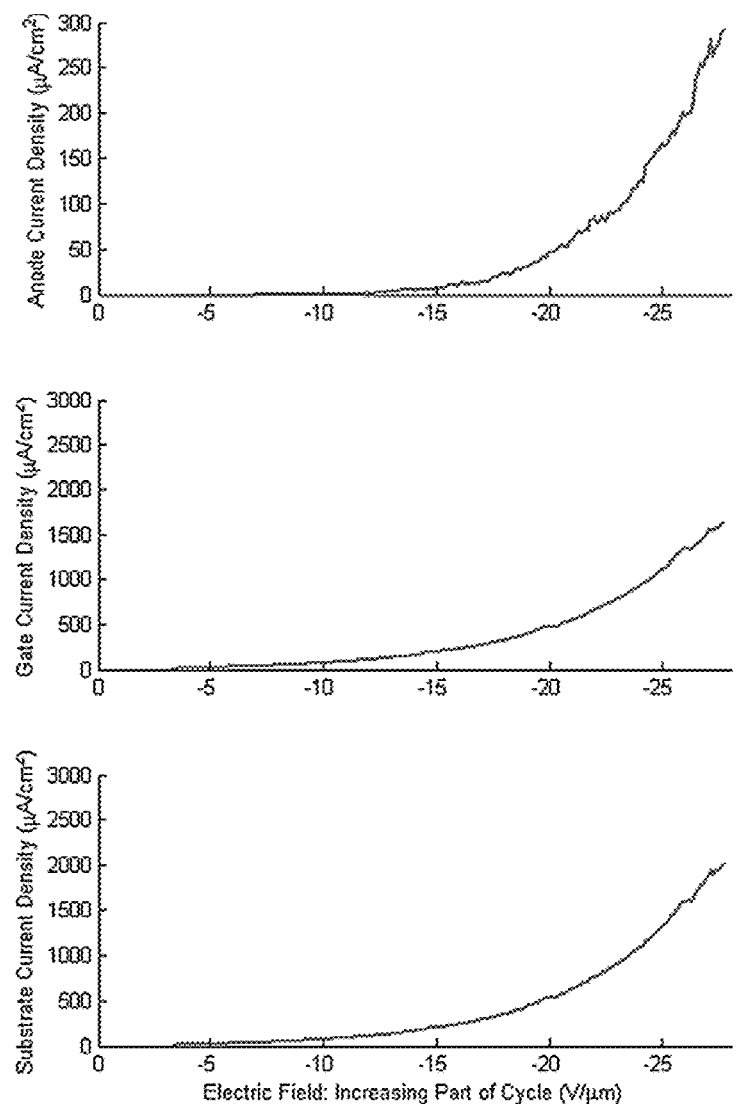
FIG. 12 is a series of graphs of field emission data in accordance with exemplary embodiments of the disclosure

An initial FE test, shown in FIG. 12, demonstrates anode turn on (defined as 10 µA cm⁻²) at 140 V and an electric field of 16 V µm⁻¹. In order to prevent electrical shorting, this sample has far from ideal carbon nanotube growth that is ~2 µm long. The electric field is approximated by estimating the spacing between the carbon nanotube and the gate to be 9 pm. The sample produced a maximum anode current density of 293 µA cm⁻² at 250 V with an active area of 0.347 cm². The maximum current density at the gate is much higher with 1.68 mA cm⁻² at 250 V.

Analysis shows that on average 89% of the current goes to the gate, 8% to the anode, and 3% is lost (electrons not collected at the anode or gate). Thus, a majority of the electrons that make it past the gate are captured by the anode in the current configuration. Unfortunately, most of the electrons are captured by the gate. Since FE is occurring, it is assumed that a majority of the gate current is from field-emitted electrons with a small contribution of leakage current. The high proportion of gate current is attributed to the very short carbon nanotube growth used in this test, which gives a longer distance for the electrons to disperse into the gate. Typically, Spindt-based cathodes that are fabricated with the emitter parallel to the gate have a much higher proportion of electrons captured by the anode. When a higher proportion of anode current is achieved, an effective carbon nanotube triode electron source can be realized, especially considering that the pitch could be much smaller than the 100 µm pitch of the sample.

Current density is reported in terms of actual area of the array and not the total area of carbon nanotube growth to give a realistic estimation of the density. However, this does not allow for comparison of the turn-on field to other planar carbon nanotube electron sources. For the sake of comparison, current density calculated using just the carbon nanotube growth area gives a turn on at ~5 V µm⁻¹ with a maximum current density of 360 mA cm². This turn-on field is slightly high compared to the 1-4 V µm−1 that is observed in the literature for other carbon nanotube FE devices. This could be due to the very short carbon nanotube growth and electrostatic screening of the electric field by the walls of the Si pit.

Figure 13:
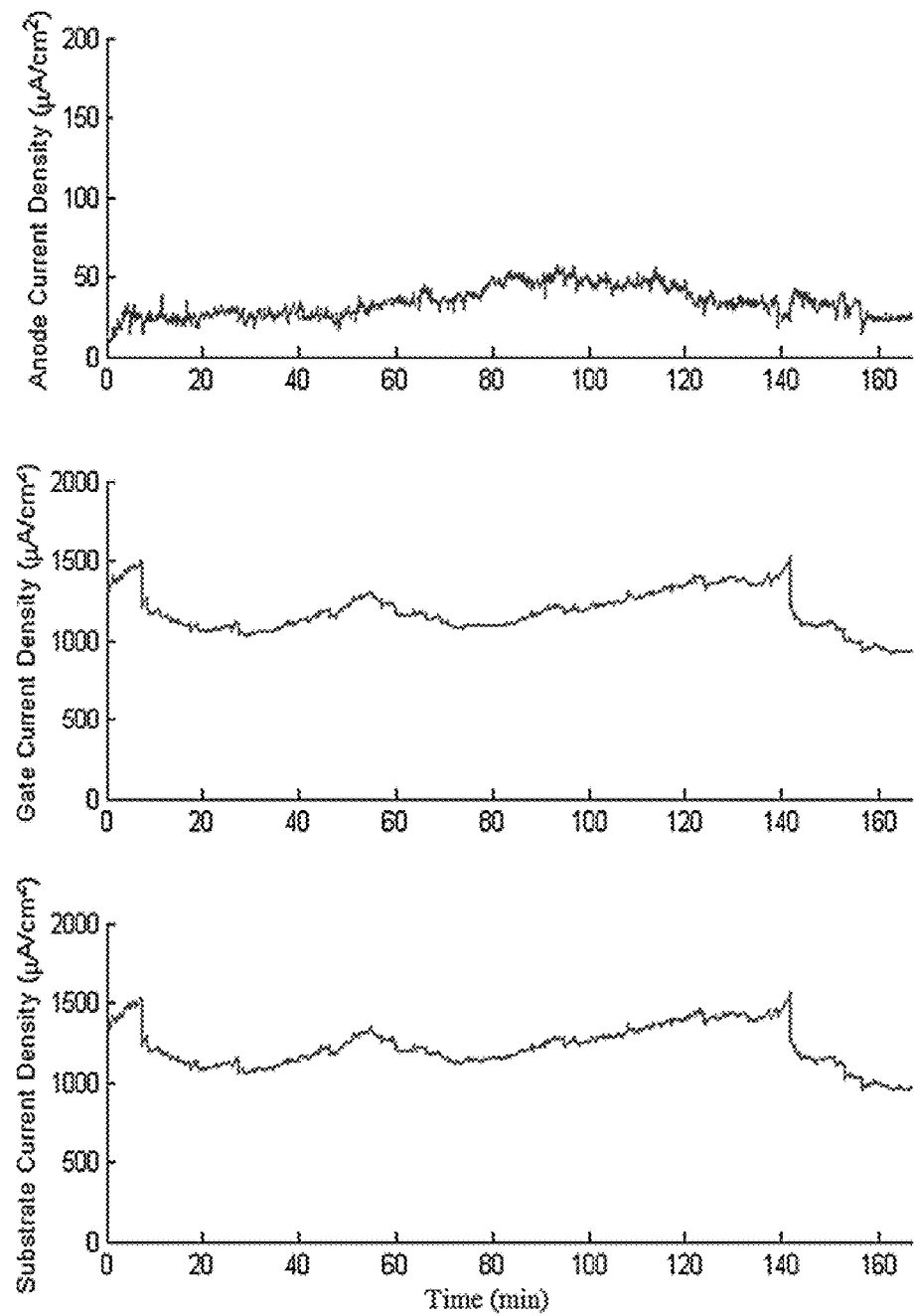
FIG. 13 is a series of graphs of voltage emission data in accordance with exemplary embodiments of the disclosure.

An example of constant-voltage testing is shown in FIG. 13. A constant emission of <50 µA cm⁻² at the anode and 1-1.5 mA cm² at the cathode over 167 min is achieved. Significant instability is observed, which makes it difficult to discern any gradual degradation. However, no sudden degradation is observed at the anode. This data shows that the emission can be sustained over extended periods.

Other carbon nanotube field emitters have a turn-on potential that is normally much higher, ranging from ~150 to 2000 V, due in part to larger electrode separations (such as in diode configurations). The initial FE tests exhibit the capabilities of this triode design, demonstrating that a low voltage (140 V) compared to other devices is needed for turn on. If electrical isolation can be maintained with longer carbon nanotube growth, a much lower turn-on field and a larger anode current should be achieved.

The embodiments of the disclosure are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the disclosure will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the disclosure should not be limited to the above-discussed embodiments, and should only be defined by the following claims and all equivalents.

What is claimed is:

1. A device comprising a cathode, wherein the cathode comprises:
    an electrically-conductive substrate layer having a first side and an opposing second side,
    an insulating layer disposed on the substrate layer,
    a plurality of apertures in the insulating layer, and
    a plurality of pits in the substrate layer substantially aligned with the plurality of apertures, each of the plurality of pits having first end and a second end, wherein the first ends of the plurality of pits are positioned adjacent the first side of the substrate layer and the second ends of the plurality of pits are positioned at a location between the first side and the second side of the substrate layer, and wherein each of the plurality of pits has an aspect ratio of depth to diameter of at least 2:1;
    wherein each aperture has a larger diameter in the distal side from the substrate and a smaller diameter in side proximate to the substrate; and
    wherein an emitter is contained within each pit, and wherein the emitter is an array of vertically aligned carbon nanotubes.

2. The device of claim 1, wherein the pit further comprises a catalyst layer disposed on the bottom of the pit.

3. The device of claim 2, wherein the catalyst layer comprises iron, nickel, cobalt, or alloy thereof.

4. The device of claim 1, further comprising a gate layer disposed on the insulating layer.

5. The device of claim 4, wherein the gate layer does not extend to the vertical space above the emitter.

6. The device of claim 4, wherein the gate layer and emitter have a horizontal buffer distance of at least 100 nm.

7. The device of claim 4, wherein the gate layer comprising polycrystalline silicon, chromium, molybdenum, titanium, or tungsten, or alloy thereof.

8. The device of claim 4, wherein the gate layer comprises polycrystalline silicon.

9. The device of claim 4, wherein the gate layer has a thickness of about 100 nm to about 600 nm.

10. The device of claim 1, wherein each pit has an aspect ratio of depth to diameter of at least 5:1.

11. The device of claim 1, wherein each pit has a diameter of at least 500 nm.

12. The device of claim 1, wherein each pit has a diameter of at least 1 μm.

13. The device of claim 1, wherein each pit has a diameter of about 1 μm to about 5 μm.

14. The device of claim 1, wherein each pit has a diameter of about 1 μm to about 3 μm.

15. The device of claim 1, wherein each pit has a depth of about 1 μm to about 100 μm.

16. The device of claim 1, wherein each pit has a depth of about 5 μm to about 50 μm.

17. The device of claim 1, wherein a horizontal distance between an upper edge of the aperture and an outer edge of the emitter is at least 100 nm.

18. The device of claim 1, wherein the thickness of the aperture is about 0.5 μm to about 4 μm.

19. The device of claim 1, wherein the thickness of the aperture is about 2 μm to about 4 μm.

20. The device of claim 1, further comprising a conductive anode.

\* \* \* \* \*